United States Patent
Danson et al.

(10) Patent No.: US 10,225,403 B2
(45) Date of Patent: Mar. 5, 2019

(54) OUTBOUND CUSTOMER INTERACTION PAIRING METHODS AND SYSTEMS

(71) Applicant: Mattersight Corporation, Chicago, IL (US)

(72) Inventors: Christopher Danson, Austin, TX (US); David Gustafson, Lake Bluff, IL (US); Charles Franklyn Mack, Austin, TX (US)

(73) Assignee: MATTERSIGHT CORPORATION, Chicago, IL (US)

( * ) Notice: Subject to any disclaimer, the term of this patent is extended or adjusted under 35 U.S.C. 154(b) by 132 days.

(21) Appl. No.: 15/368,211

(22) Filed: Dec. 2, 2016

(65) Prior Publication Data
US 2018/0159977 A1    Jun. 7, 2018

(51) Int. Cl.
  *H04M 3/51*    (2006.01)
  *H04M 3/523*   (2006.01)

(52) U.S. Cl.
  CPC ....... *H04M 3/5158* (2013.01); *H04M 3/5232* (2013.01); *H04M 3/5233* (2013.01); *H04M 3/5175* (2013.01); *H04M 3/5191* (2013.01); *H04M 2203/402* (2013.01); *H04M 2203/551* (2013.01); *H04M 2203/655* (2013.01)

(58) Field of Classification Search
  CPC .................. H04M 2203/551; H04M 2203/655
  See application file for complete search history.

(56) References Cited

U.S. PATENT DOCUMENTS

| | | | |
|---|---|---|---|
| 5,528,678 A | 6/1996 | Kaplan | |
| 5,592,543 A | 1/1997 | Smith et al. | |
| 5,825,869 A | 10/1998 | Brooks et al. | |
| 6,333,979 B1 | 12/2001 | Bondi et al. | |
| 6,459,788 B1 | 10/2002 | Khuc et al. | |
| 6,553,113 B1 | 4/2003 | Dhir et al. | |
| 6,822,945 B2 | 11/2004 | Petrovykh | |
| 7,110,525 B1 | 9/2006 | Heller et al. | |
| 7,236,583 B2 | 6/2007 | Beckstrom et al. | |
| 7,418,409 B1 | 8/2008 | Goel | |
| 7,630,905 B1 | 12/2009 | Reese | |
| 7,873,157 B1 | 1/2011 | Sim | |

(Continued)

OTHER PUBLICATIONS

Ali, Abbas R., "Intelligent call routing: Optimizing contact center throughput," MDMKDD '11. Jan. 2011, available at https://www.researchgate.net/publication/238041930_Intelligent_call_routing_Optimizing_contact_center_throughput.

(Continued)

*Primary Examiner* — Harry S Hong
(74) *Attorney, Agent, or Firm* — Haynes and Boone, LLP (57) ABSTRACT

The methods, apparatus, and systems described herein relate to routing outbound communications. The methods include receiving a list of customers to contact, determining a time that each customer on the list is available, determining a personality type of each customer on the list, determining availability of one or more agents at the time that each customer on the list is available, determining, by the one or more processors, a personality type of each available agent, matching the one or more available agents with each customer on the list based on the personality type of each customer on the list and the personality type of each available agent, and routing the one or more available agents to each customer on the list.

30 Claims, 6 Drawing Sheets

(56) References Cited

U.S. PATENT DOCUMENTS

| | | |
|---|---|---|
| 8,359,219 B2 | 1/2013 | Chishti et al. |
| 8,744,062 B2 | 6/2014 | Pickford |
| 8,781,100 B2 | 7/2014 | Spottiswoode et al. |
| 8,781,106 B2 | 7/2014 | Afzal |
| 2006/0262920 A1* | 11/2006 | Conway .............. G10L 15/1822 379/265.02 |
| 2009/0190740 A1* | 7/2009 | Chishti ............... H04M 3/5232 379/265.06 |
| 2013/0085791 A1 | 4/2013 | Flockhart et al. |
| 2014/0149168 A1 | 5/2014 | Shashkov et al. |
| 2016/0036973 A1 | 2/2016 | Harasimiuk et al. |

OTHER PUBLICATIONS

Mehrotra, Vijay et al., "Routing to Manage Resolution and Waiting Time in Call Centers with Heterogeneous Servers," *Manufacturing & Service Operations Management*, vol. 14, No. 1, Winter 2012, pp. 66-81, available at http://faculty.washington.edu/yongpin/wait_and_resolution.pdf.

* cited by examiner

OUTBOUND CUSTOMER INTERACTION PAIRING METHODS AND SYSTEMS

TECHNICAL FIELD

The present disclosure relates generally to methods and systems related to customer interactions with contact centers, and more particularly to matching or pairing an outbound interaction with an agent, such as a service provider, based on agent availability and agent proficiency, including for working with a particular customer personality type.

BACKGROUND OF THE DISCLOSURE

A service provider center is a service company which provides operator-assisted voice services. A service provider center can be comparable to a telephone or call center in which a group of specific employees or "agents" handle telephone inquiries. Typical areas of use are mail-order companies, insurance companies and customer service and also customer hot lines.

In typical service center operations, service providers (also referred to as agents or contact center agents) are primarily engaged in handling incoming calls from persons seeking services provided by the service or contact center. This is not, however, the only task agents handle. In many instances, there is a need for agents to make outgoing calls. An agent, for example, in interaction with a calling party, may need to research some item of information, then place a call back to the original caller. In other instances, the primary function of the call center may be agent-initiated calls. Calls made from the center can include fraud/loss prevention, telemarketing, sales or fund-raising calls, as well as calls for contact list updating, surveys or verification services, etc. In any case, there are often reasons for agents taking part in calls originated at the contact center, in addition to their other duties. A contact center which also deals with outgoing traffic becomes a sales instrument that can actively conduct telephone marketing and can also gain new customers, or provide other services related to new or existing customers.

In the operation of contact centers where communications are initiated from the contact center, it is known to make calls by an automatic outbound dialing system, where calls placed by the dialing system are answered by clients and then transferred quickly to available agents. Typically, the outbound communications are matched based only on availability of agents, which may not be ideal for either the contacted person or the agent. Accordingly, a need exists for better ways to pair an outbound communication or task between service provider and customer.

SUMMARY

The present disclosure describes methods and systems that to determine the routing of an outbound customer communication, task, and/or service. The present methods determine a personality type of a customer, and use that personality type to facilitate improved customer interactions with an available service provider, e.g., a contact center agent.

In one aspect, the present disclosure relates to a system for routing outbound communications. The system includes a node that includes a processor and a non-transitory computer readable medium operably coupled thereto, and the non-transitory computer readable medium includes a plurality of instructions stored in association therewith that are accessible to, and executable by, the processor. The plurality of instructions, when executed, compile a list of customers to contact at a specific time for each customer; determine which customers on the list are available at the specific time; determine a personality type of each available customer; determine one or more agents that are available to contact each available customer at the specific time; determine, for each available agent, a proficiency for dealing with the personality type of each available customer; and match one or more available agents with each available customer based on the one or more available agents' proficiency for dealing with the personality type of each available customer.

In a second aspect, the present disclosure relates to a method of routing outbound communications. The method includes receiving, by one or more processors, a list of customers to contact; determining, by the one or more processors, a time that each customer on the list is available; determining, by the one or more processors, a personality type of each customer on the list; determining, by the one or more processors, availability of one or more agents at the time that each customer on the list is available; determining, by the one or more processors, a personality type of each available agent; matching, by the one or more processors, the one or more available agents with each customer on the list based on the personality type of each customer on the list and the personality type of each available agent; and routing, by the one or more processors, the one or more available agents to each customer on the list.

In a third aspect, the present disclosure relates to a non-transitory computer readable medium that includes a plurality of instructions, which in response to a computer system, cause the computer system to perform a method. The method includes receiving a list of customers to contact; determining a time when each customer on the list is available to answer an outbound communication from an agent; determining a personality type of each customer on the list; determining availability of a plurality of agents at the time when each customer on the list is available; determining a personality type of each available agent from the plurality of available agents; pairing a plurality of available agents with each customer on the list based on the personality type of each customer on the list and the personality type of each available agent from the plurality of available agents; and ranking the plurality of available agents based on the personality type of each available agent and one or more skills relevant to the purpose of the outbound communication possessed by each available agent. In some embodiments, a first computer-implemented linguistic algorithm is applied to text of past interaction data, social media data, or both, of each customer on the list to determine the personality type of each available customer, and a second computer-implemented linguistic algorithm is applied to text of past interaction data, surveys, or both to determine the personality type of each available agent.

Various preferred embodiments disclosed herein are applicable to each of the above-noted aspects of the present disclosure. For example, in one embodiment, the determining a personality type of each customer on the list, and determining a personality type of each available agent from the plurality of available agents, each include applying at least a first computer-implemented linguistic algorithm to text of past interaction data, social media data, surveys, or a combination thereof, of each customer on the list (or of each agent) to determine a personality type of each customer on the list (or of each agent). In another embodiment, a second computer-implemented linguistic algorithm can be used, with the first configured for determination of customer personality type and the second configured for determination of agent personality type.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF PREFERRED EMBODIMENTS

The present disclosure advantageously describes methods and systems that optimize the routing of outbound customer communications. Outbound customer communications can relate to one or more of appointment setting, collection reminders, sales, customer retention activities (e.g., follow-up communications, customer satisfaction surveys, etc.), providing responses to customer queries, fraud checking (e.g., as to suspicious credit activities), and market research data collection, among others. Outbound contact center agents should be able to ask the right questions, assess the customer's needs, provide a positive impression where possible, and understand when to present offers and close deals. Pairing or matching outbound calls or other communications with the "best" agents is important because the pairing can influence the outcome of the communication, e.g., will a customer remain a customer, will a customer make a further purchase or more valuable purchases in the future, will the customer refer friends and/or family, will the service provider be able to successfully address a customer's need, have the customer's needs been objectively or subjectively met by a particular contact center agent or type of agent, etc.

As used herein, the term "contact center agent" or "service provider" includes those who provide any outbound communication, task, or service to customers. As used herein, "customer" refers to anyone who receives a communication, task (e.g., completing a survey), or service. The communication, task, or service can relate to customers who already have a relationship with a business, or who are considering whether to have a relationship with such a business, e.g., whether to purchase or use the goods or services of such business. Thus, the term of "customer" in the present disclosure also encompasses both present and future/potential customers.

The methods disclosed herein include compiling (or receiving) a list of customers to contact, determining which customers to contact based on their predicted availability at a certain time, determining personality types of the customers to be contacted, determining availability of agents, determining agent proficiency for dealing with the customer personality types on the list to be contacted, matching an agent proficient with the customer personality type with the customer, and connecting the agent with the customer. In another embodiment, the methods include compiling a list of customers to contact, determining or predicting the availability of the customers, determining personality type of the customers on the list to be contacted, determining agent availability, determining personality type of available agents, matching an available agent who has a personality type compatible with the customer personality type, and connecting the available agent to the customer.

Systems and apparatuses for carrying out these methods are also part of the present disclosure. An exemplary system to route outbound customer communications includes, for example, a node including a processor and a non-transitory computer readable medium operably coupled thereto, the non-transitory computer readable medium including a plurality of instructions stored in association therewith that are accessible to, and executable by, the processor. In one embodiment, when executed, the plurality of instructions compile a list of customers to contact at a specific time for each customer, determine which customers on the list are available at the specific time, determine a personality type of each available customer, determine one or more agents that are available to contact each available customer at the specific time, determine, for each available agent, a proficiency for dealing with the personality type of each available customer, and match one or more available agents with each available customer based on the one or more available agents' proficiency for dealing with the personality type of each available customer.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Figure 1:
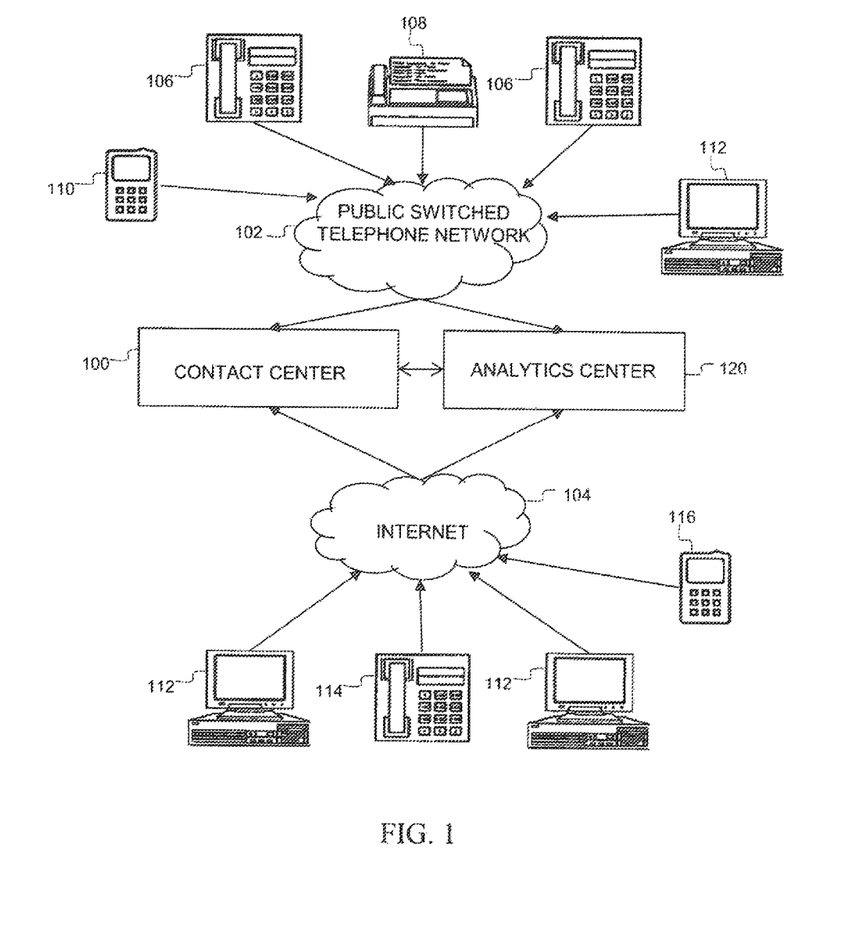
FIG. 1 is a simplified block diagram of an embodiment of a contact center according to various aspects of the present disclosure.

FIG. 1 is a simplified block diagram of an embodiment of a contact center 100 according to various aspects of the present disclosure. A "contact center" as used herein can include any facility or system server suitable for receiving and recording electronic communications from customers, as well as initiating electronic communications to customers. A contact center can thus include a call center, or one or more alternative forms of contact to facilitate communications, or calls plus other forms of contact. It should be understood that a contact center need not merely be a single physical location, but can be a plurality of agents at different work locations or even a virtual contact center where a communication engine ties each remotely located agent together. This can permit one or more supervisors, managers, an analytics center, or the like, or any combination thereof, to coordinate activities for the contact center agents, wherever they may be located. Such customer-agent communications can include, for example, telephone calls, video interactions, facsimile transmissions, e-mails, web interactions, and voice over IP ("VoIP"). Various specific types of communications contemplated through one or more of these channels include, without limitation, email, SMS data (e.g., text), tweet, chats, instant message, web-form submission, smartphone app, social media data, and web content data (including but not limited to internet survey data, blog data, microblog data, discussion forum data, and chat data), etc. In some embodiments, the communications can include customer tasks, such as taking an order, making a sale, responding to a complaint, returning a call or initiating a communication, providing a service, etc. It is contemplated that these communications may be transmitted by and through any type of telecommunication device and over any medium suitable for carrying such data. For example, the communications may be transmitted by or through telephone lines, cable, or wireless communications (e.g., satellite, Wi-Fi, bluetooth, cellular phone network, etc.). As shown in FIG. 1, the contact center 100 of the present disclosure is adapted to receive, record, and initiate varying electronic communications and data formats that represent an interaction that may occur between a customer (e.g., a caller) and a contact center agent during fulfillment of a customer and agent transaction. In one embodiment, the contact center 100 records all of the customer contacts in uncompressed audio formats. In the illustrated embodiment, customers may communicate with agents associated with the contact center 100 via multiple different communication networks, such as a public switched telephone network (PSTN) 102 or the Internet 104, e.g., including via Skype®, Facetime®, Tango™, or any other communication app, program, website, or other software or hardware. For example, a customer or an agent may initiate an interaction session through traditional telephone 106, a fax machine 108, a cellular (i.e., mobile) telephone 110 (e.g., such as a smartphone with video capabilities), a personal computing device 112 with a modem, or other legacy communication device via the PSTN 102. Further, the contact center 100 may accept internet-based interaction sessions from personal computing devices 112, VoIP telephones 114, and internet-enabled smartphones 116 and personal digital assistants (PDAs), and initiate internet-based interactions to these devices.

As one of ordinary skill in the art would recognize, the illustrated example of communication channels associated with a contact center 100 in FIG. 1 is just an example, and the contact center may accept customer interactions, and other analyzed interaction information from an analytics center, through various additional and/or different devices and communication channels whether or not expressly described herein.

For example, in some embodiments, internet-based interactions, video-based interactions and/or telephone-based interactions may be routed through an analytics center 120 before reaching the contact center 100 or may be routed simultaneously to the contact center 100 and the analytics center (or even directly and only to the contact center). In other embodiments, the interactions occur with the contact center 100, and the analytics center 120 provides back-end support between contact center 100 interactions with customers. In some instances, the analytics center 120 is a third-party analytics company that captures interaction data associated with the contact center 100 (including interaction data provided by a contact center or company associated with a contact center, or both) and applies computer-implemented linguistic algorithms to the data to generate personality type data for the agents in a contact center, the customers thereof, or both. For example, the analytics center 120 may provide an analysis of customer and/or agent voice data according to the present disclosure, initiate a customer-agent communication, determine a personality type of the customer, determine a personality type of the agent, etc. The analytics center 120 may be controlled by the same entity or a different entity than the contact center 100. Further, the analytics center 120 may be a part of, or independent of, the contact center 100.

Figure 2:
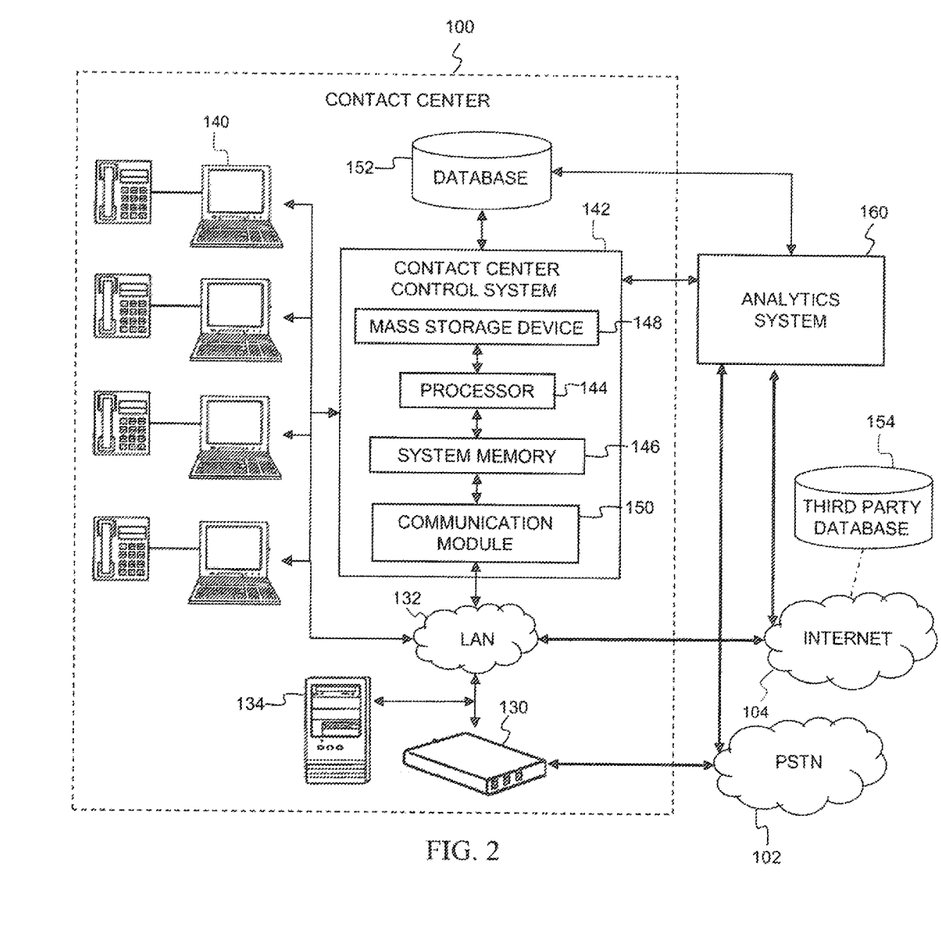
FIG. 2 is a more detailed block diagram of the contact center of FIG. 1 according to aspects of the present disclosure.

FIG. 2 is a more detailed block diagram of an embodiment of the contact center 100 according to aspects of the present disclosure. As shown in FIG. 2, the contact center 100 is communicatively coupled to the PSTN 102 via a distributed private branch exchange (PBX) switch 130. The PBX switch 130 provides an interface between the PSTN 102 and a local area network (LAN) 132 within the contact center 100. In general, the PBX switch 130 connects trunk and line station interfaces of the PSTN 102 to components communicatively coupled to the LAN 132. The PBX switch 130 may be implemented with hardware or virtually. A hardware-based PBX may be implemented in equipment located local to the user of the PBX system. In contrast, a virtual PBX may be implemented in equipment located at a central telephone service provider that delivers PBX functionality as a service over the PSTN 102. Additionally, in one embodiment, the PBX switch 130 may be controlled by software stored on a telephony server 134 coupled to the PBX switch. In another embodiment, the PBX switch 130 may be integrated within telephony server 134. The telephony server 134 incorporates PBX control software to control the initiation and termination of connections between telephones within the contact center 100 and outside trunk connections to the PSTN 102. In addition, the software may monitor the status of all telephone stations coupled to the LAN 132 and may be capable of responding to telephony events to provide traditional telephone service. In certain embodiments, this may include the control and generation of the conventional signaling tones including without limitation dial tones, busy tones, ring back tones, as well as the connection and termination of media streams between telephones on the LAN 132. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

In one embodiment, the telephony server 134 includes a trunk interface that utilizes conventional telephony trunk transmission supervision and signaling protocols required to interface with the outside trunk circuits from the PSTN 102. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multi-channel data images, video, text or audio.

The telephony server 134 includes hardware and software components to interface with the LAN 132 of the contact center 100. In one embodiment, the LAN 132 may utilize IP telephony, which integrates audio stream control with legacy telephony functions and may be supported through the H.323 protocol. H.323 is an International Telecommunication Union (ITU) telecommunications protocol that defines a standard for providing voice services over data networks. H.323 permits users to make point-to-point audio phone calls over a local area network. IP telephony systems can be integrated with the public telephone system through an IP/PBX-PSTN gateway, thereby allowing a user to place telephone calls from an enabled computer. For example, a call from an IP telephony client within the contact center 100 to a conventional telephone outside of the contact center would be routed via the LAN132 to the IP/PBX-PSTN gateway. The IP/PBX-PSTN gateway would then translate the H.323 protocol to conventional telephone protocol and route the call over the PSTN 102 to its destination. Conversely, an incoming call from a customer over the PSTN 102 may be routed to the IP/PBX-PSTN gateway, which translates the conventional telephone protocol to H.323 protocol so that it may be routed to a VoIP-enable phone or computer within the contact center 100.

The contact center 100 is further communicatively coupled to the Internet 104, for example, via hardware and software components within the LAN 132. One of ordinary skill in the art would recognize that the LAN 132 and the connections between the contact center 100 and external networks such as the PSTN 102 and the Internet 104 as illustrated by FIG. 2 have been simplified for the sake of clarity and the contact center may include various additional and/or different software and hardware networking components such as routers, switches, gateways, network bridges, hubs, and legacy telephony equipment. It should be understood that the entire arrangement between customer and agent at the contact center or analytics center can be conducted via VoIP, or VoIP connected to traditional telephony, all in accordance with various aspects of the present disclosure. In various embodiments, the customer interactions that occur at the contact center 100 include video interactions with a voice component including, but not limited to video conferences, Skype® sessions, and FaceTime® calls.

As shown in FIG. 2, the contact center 100 includes a plurality of agent workstations 140 that enable agents employed by the contact center 100 to initiate and engage in customer interactions over a plurality of communication channels. In one embodiment, each agent workstation 140 may include at least a telephone and a computer workstation. In other embodiments, each agent workstation 140 may include a computer workstation that provides both computing and telephony functionality. Through the workstations 140, the agents may engage in telephone conversations with the customer, respond to email inquiries, receive faxes, engage in instant message conversations, respond to website-based inquires, video chat with a customer, and otherwise participate in various customer interaction sessions across one or more channels. Further, in some embodiments, the agent workstations 140 may be remotely located from the contact center 100, for example, in another city, state, or country. Alternatively, in some embodiments, an agent may be a software-based application configured to interact in some manner with a customer. An exemplary software-based application as an agent is an online chat program designed to interpret customer inquiries and respond with pre-programmed answers.

The contact center 100 further includes a contact center control system 142 that is generally configured to provide recording, voice analysis, behavioral analysis, storage, and other processing functionality to the contact center. In the illustrated embodiment, the contact center control system 142 is an information handling system such as a computer, server, workstation, mainframe computer, or other suitable computing device. In other embodiments, the control system 142 may be a plurality of communicatively coupled computing devices coordinated to provide the above functionality for the contact center 100. The control system 142 includes a processor 144 that is communicatively coupled to a system memory 146, a mass storage device 148, and a communication module 150. The processor 144 can be any custom made or commercially available processor, a central processing unit (CPU), an auxiliary processor among several processors associated with the control system 142, a semiconductor-based microprocessor (in the form of a microchip or chip set), a macroprocessor, a collection of communicatively coupled processors, or any device for executing software instructions. The system memory 146 provides the processor 144 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data may be stored on the mass storage device 148. Examples of mass storage devices may include hard discs, optical disks, magneto-optical discs, solid-state storage devices, tape drives, CD-ROM drives, and/or a variety other mass storage devices known in the art. Further, the mass storage device may be implemented across one or more network-based storage systems, such as a storage area network (SAN). The communication module 150 is operable to receive and transmit contact center-related data between local and remote networked systems and communicate information such as customer interaction recordings between the other components coupled to the LAN 132. Examples of communication modules may include Ethernet cards, 802.11 WiFi devices, cellular data radios, and/or other suitable devices known in the art. The contact center control system 142 may further include any number of additional components, which are omitted for simplicity, such as input and/or output (I/O) devices (or peripherals), buses, dedicated graphics controllers, storage controllers, buffers (caches), and drivers. Further, functionality described in association with the control system 142 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 142 is configured to record, collect, and analyze customer voice and other structured and unstructured data, and other tools may be used in association therewith to increase efficiency and efficacy of the contact center. As an aspect of this, the control system 142 is operable to record unstructured interactions between customers and agents occurring over different communication channels including without limitation telephone conversations, email exchanges, website postings, social media communications, smartphone application (i.e., app) communications, fax messages, instant message conversations, chats, SMS or other messaging, video conversations, and other communications, etc. For example, the control system 142 may include a hardware or software-based recording server to capture the audio of a standard or VoIP telephone connection established between an agent workstation 140 and an outside customer telephone system. Further, the audio from an unstructured telephone call may be transcribed manually or automatically and stored in association with the original audio. In one embodiment, multiple communication channels (i.e., multi-channel) may be used according to the invention, either in real-time to collect information, for evaluation, or both. For example, control system 142 can receive, evaluate, and store telephone calls, emails, fax messages, chats, SMS or other messaging, video discussions, and other communications as noted above. Thus, multi-channel can refer to multiple channels of interaction data, or analysis using two or more channels.

In addition to unstructured interaction data such as interaction transcriptions, the control system 142 is configured to captured structured data related to customers, agents, and their interactions. For example, in one embodiment, a "cradle-to-grave" recording may be used to record all information related to a particular communication or contact from the time the contact enters the contact center to the later of: the customer terminating contact or the agent completing the transaction. All or a portion of the interactions during the communication or other contact may be recorded, including interaction with an interactive voice response (IVR) system for communications with a verbal component, time spent on hold, data keyed through the customer's key pad, conversations with the agent, and screens displayed by the agent at his/her station during the transaction. Additionally, structured data associated with interactions with specific customers may be collected and associated with each customer, including without limitation the number and length of contacts the customer has had with the contact center, contact origination information, reasons for interactions, outcome of interactions, average hold time, agent actions during interactions with customer, manager escalations during customer contact, types of social media interactions, number of distress events during interactions, survey results, and other interaction information. In addition to collecting interaction data associated with a customer, the control system 142 is also operable to collect biographical profile information specific to a customer including, without limitation, customer phone number or email address, account/policy numbers, address, employment status, income, gender, race, age, education, nationality, ethnicity, marital status, credit score, customer "value" data (i.e., customer tenure, money spent as customer, etc.), personality type (e.g., as determined by past interactions), and other relevant customer identification and biological information. The control system 142 may also collect agent-specific unstructured and structured data including without limitation agent personality type, gender, language skills, performance data (e.g., customer retention rate, etc.), tenure and salary data, training level, average hold time during interactions, manager escalations, agent workstation utilization, and any other agent data relevant to contact center performance. Additionally, one of ordinary skill in the art would recognize that the types of data collected by the contact center control system 142 that are identified above are simply examples and additional and/or different interaction data, customer data, agent data, and telephony data may be collected and processed by the control system 142. Thus, in some embodiments, the personality types of the agents and/or customers may be determined through linguistic analysis as discussed herein, while in other embodiments the personality types of agents and/or customers may be retrieved, e.g., from a database of structured data.

The control system 142 may store recorded and collected interaction data in a database 152, including customer data and agent data. In certain embodiments, agent data, such as agent scores for dealing with customers and agent personality type, are updated daily. The database 152 may be any type of reliable storage solution such as a RAID-based storage server, an array of hard disks, a storage area network of interconnected storage devices, an array of tape drives, or some other scalable storage solution located either within the contact center or remotely located (i.e., in the cloud). Further, in other embodiments, the contact center control system 142 may have access not only to data collected within the contact center 100 but also data made available by external sources such as a third party database 154. In certain embodiments, the control system 142 may query the third party database for customer data such as credit reports, past transaction data, and other structured and unstructured data.

In some embodiments, an analytics system 160 may also perform some or all of the functionality ascribed to the contact center control system 142 above. Thus, the terms analytics center and analytics system may be used interchangeably herein with contact center and contact center system in various embodiments. For instance, the analytics system 160 may record telephone and internet-based interactions, as well as perform behavioral analyses, predict customer personalities or customer profiles, retrieve pre-existing customer profiles, and perform other contact center-related computing tasks, as well as combinations thereof. The analytics system 160 may be integrated into the contact center control system 142 as a hardware or software module and share its computing resources 144, 146, 148, and 150, or it may be a separate computing system housed, for example, in the analytics center 120 shown in FIG. 1. In the latter case, the analytics system 160 includes its own processor and non-transitory computer-readable storage medium (e.g., system memory, hard drive, etc.) on which to store analytics software and other software instructions.

The interaction data collected from one channel or multi-channels in the context of the control center 100 may be subjected to a linguistic-based psychological behavioral model to assess the personality of customers and agents associated with the interactions. For example, such a behavioral model may be applied to the transcription of a telephone call or other voice communication between a customer and agent to gain insight into why a specific outcome resulted from the interaction.

In one embodiment, a voice analysis module in contact center control system 142 mines interaction data for behavioral signifiers associated with a linguistic-based psychological behavioral model. In particular, the voice analysis module searches for and identifies text-based keywords (i.e., behavioral signifiers) relevant to a predetermined psychological behavioral model. In a preferred embodiment, multi-channels are mined for such behavioral signifiers.

It is well known that certain psychological behavioral models have been developed as tools, and any such behavioral model available to those of ordinary skill in the art will be suitable for use in connection with the disclosure. These models are used to attempt to evaluate and understand how and/or why one person or a group of people interacts with another person or group of people. One example is the Big Five inventory model (©2000) by UC Berkeley psychologist Oliver D. John, Ph.D. Another is the Process Communication Model™ developed by Dr. Taibi Kahler. Exemplary personality types, which will vary from model to model and can be selected as desired for a given application or across all applications, might include, for example: Thoughts, Opinions, Reactions, Emotions. These models generally presuppose that all people fall primarily into one of the enumerated basic personality types. In some cases, the models categorize each person as one of these four types (or some other number of personality types), all people have parts of each of the types within them. Each of the types may learn differently, may be motivated differently, may communicate differently, and may have a different sequence of negative behaviors in which they engage under certain circumstances, e.g., when they are in distress. Importantly, each personality type may respond positively or negatively to communications that include tones or messages commonly associated with another of the personality types. Thus, an understanding of a user's personality type typically offers guidance as to how the user will react or respond to different situations.

Linguistic algorithms can be applied to the text of communication to yield a personality type. A linguistic algorithm(s) is typically created by linguistic analysts and such algorithm(s) are typically trained using previously analyzed customer-agent communications. In one embodiment, the analyst(s) can review communications and manually label keywords or terms that are relevant to an identified personality type. The computer-implemented algorithm is trained to check for those keywords and the number of times they are used in the communications. A more sophisticated algorithm may be used that additionally checks for use of the keywords in context. One master algorithm containing many specific algorithms may also be used.

The present disclosure amounts to significantly more than just the application of algorithms to data to yield a personality type. Instead, the present disclosure describes how the algorithms are used to match and ultimately route a contact center agent/service provider to a customer in an outbound communication, which is a tangible, physical, real-world step. In other embodiments, the systems, methods, and non-transitory computer readable media described herein connect an available contact center agent to a customer on the available list in an outbound communication, yet a further tangible, physical, real-world step. The additional steps described herein include compiling a list of customers, determining availability of customers and agents, and providing a list of matched agents and customers to a communication router, which contacts the customer and then routes the agent to the customer such as via a phone call or video chat, and in many embodiments, connects the agent to the customer. When viewing all of these steps as a whole, the combination of these steps taken together amount to significantly more than simply calculating a personality type using algorithms. The present disclosure does not merely use the algorithms in isolation, but integrates the use of the algorithms into the communication routing process. The totality of the steps act in concert to improve another technical field—communication routing.

In addition to determining personality type from the interaction data, the control system 142 may also or alternatively apply distress analysis techniques to the interaction data to detect distress events. For example, when applied to a telephone- or other verbal-based interaction session, linguistic-based distress analysis may be conducted on both a textual translation of voice data and an audio file containing voice data. Accordingly, linguistic-based analytic tools as well as non-linguistic analytic tools may be applied to the audio file. In particular, the control system 142 may apply spectral analysis to the audio file voice data while applying a human speech/linguistic analytical tool to the text file. Linguistic-based analysis and computer-implemented algorithms for identifying distress can be applied to the textual translation of the communication. Resultant distress data may be stored in the database 152 or elsewhere for subsequent analysis of the communication. Distress event data and other linguistic-based analytic data may be considered behavioral assessment data in some instances. Further, in other embodiments, the control system 142 may be operable to apply voice printing techniques to the unstructured audio from various customer interactions. For example, a recorded sample may be utilized to identify, or facilitate identification of, a customer in the event the customer did not supply any identifying information. Distress considerations can be important because each of the different personality types learns differently, is motivated differently, communicates differently, and has a different sequence of negative behaviors they engage in when they are in distress. Additional embodiments regarding distress analysis and/or inclusion of distress-type behavioral-assessment data is described in U.S. Pat. No. 8,781,102, which is incorporated herein by express reference thereto.

Figure 3:
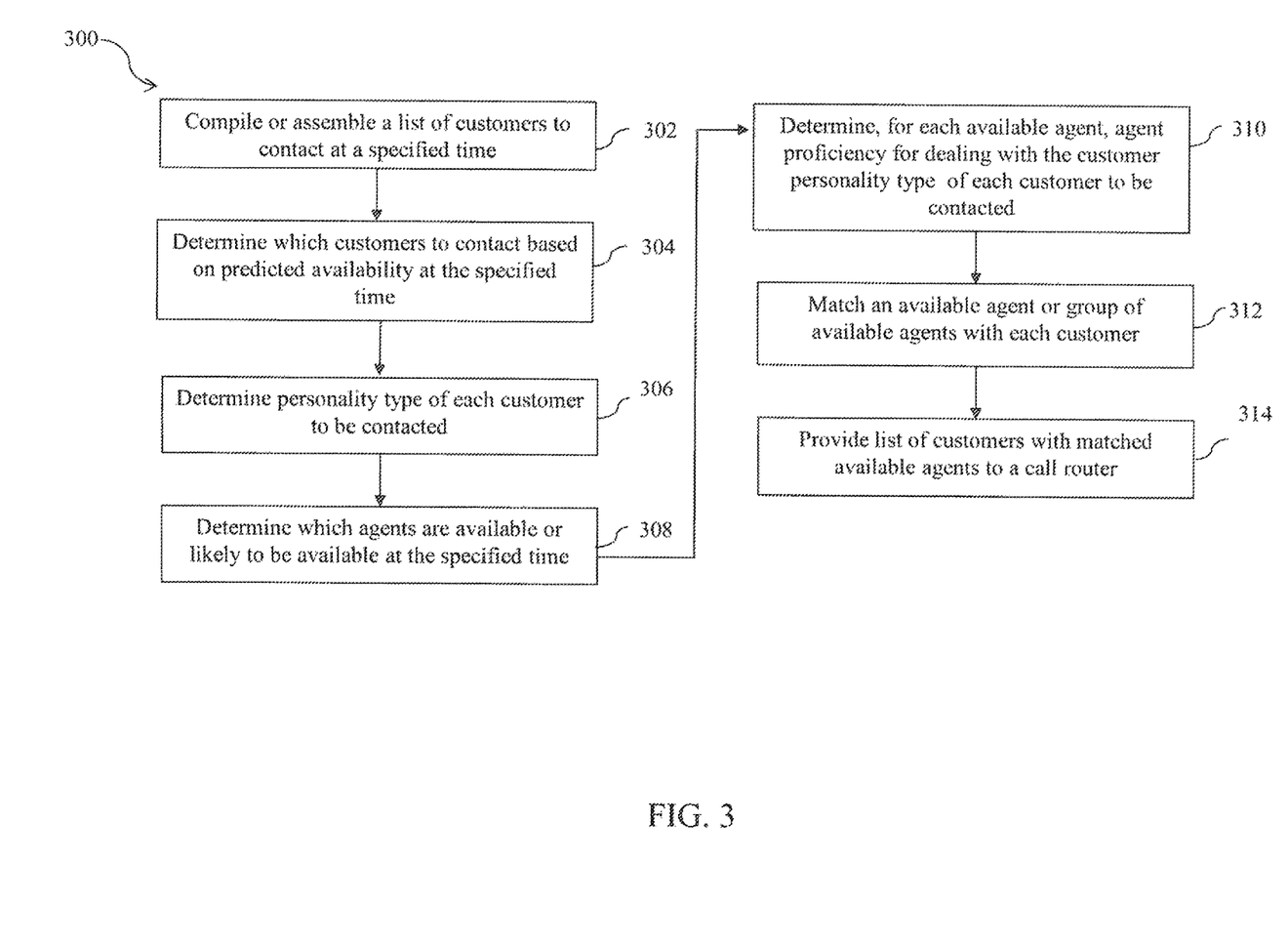
FIG. 3 is a flowchart illustrating a method for routing an outbound customer communication according to one embodiment of the present disclosure.

An exemplary method 300 of optimizing the routing of outbound customer tasks or communications will now be described with respect to FIG. 3. At step 302, control system 142 compiles or otherwise assembles a list of customers to contact at a specified time. For example, control system 142 may select a time (including a time range) of 9-12 am, 2-3 pm, and/or 5 pm, and gather customer names to contact at any or all of these times. The control system 142 may also be configured to block calling or other specific communications during times prohibited by local law in the customer's jurisdiction. The customers to be contacted can be based on the purpose of the outbound communication (e.g., sales, marketing, survey, fraud confirmation or inquiry, collection, customer assistance, customer retention, etc.). Other communications may be originated from a contact center as well, including to provide services such as technical services, health services, financial consulting services (e.g., 401(k) plans, IRA plans, etc.), and other services that may be provided remotely. In some embodiments, the control system 142 receives the list of customers to contact from, for example, a sales or telemarketing company.

At step 304, control system 142 determines which customers on the list to contact based on their predicted availability at the specified time. The availability of the customers can be predicted based on a variety of factors, such as interaction history of the customer with the contact center (e.g., communication patterns coming in to the contact center can indicate which times of day a customer is most likely available to be available for communication with a contact center agent) and/or demographic information (e.g., age and/or employment status may suggest contacting a customer at home or on a cell phone if authorized, or may suggest calling an office number during 9-5 business hours on weekdays if the customer is employed, if authorized, or communicating in some other manner at a selected time).

In various embodiments, a communication history record of a particular customer is examined to determine the probability of contact for a customer (e.g., if it is likely that the customer will answer a live communication with a contact center agent). For example, if the communication history record indicates that a customer calls or otherwise contacts the contact center between 9-10 am and 4-5 pm, the probability that the customer will answer a communication at those times is relatively high. Other communication histories might show contact by a customer only from 8-9 p.m. weeknights or from 8-6 p.m. on weekends, and the probability such a customer will be available then is relatively high.

For customers who do not have a communication history, a history of a similar customer can be analyzed. The similar customer can be identified based on one or more factors, including gender of the customer, customer occupation, customer age, and residence of the customer. In various embodiments, however, the gender, age, residence, and/or occupation of the customer to be contacted can be evaluated to determine the probability of the customer answering the call or other communication.

At step 306, control system 142 determines the personality type of each customer that is to be contacted. In various embodiments, the customer is a repeat customer and already has a stored customer profile with the contact center 100. In these instances, the contact center 100 can simply retrieve a pre-existing customer profile of the customer (including personality type).

In other embodiments, the control system 142 predicts the personality type of the customer using past interaction and/or publicly available data, such as social media. Examples of social media data include posts on Facebook®, tweets on Twitter®, posts on Instagram®, and videos on YouTube®. Social media can be mined or scraped to extract data provided by the customer.

In one embodiment, the prediction of personality type is based on past calls or other communications to the contact center 100 and/or other organizations. For instance, the prediction can be based on previous transactions between the customer and contact center, the answers to menu choices, past purchase history, past communication history, past survey responses, etc. These histories can be general, such as the customer's general history for purchasing products, average contact time with an agent, or average customer satisfaction ratings. As described above, text of these interactions can be input into a linguistic model to provide a personality type of the customer.

At step 308, control system 142 determines which agents are available or likely to be available at the specified time. Expected availability of agents may be predicted, for example, based on an expected duration of an agent's communications and the number of outbound communications already assigned to the agent. In some embodiments, available agents that have exceeded a predetermined work threshold are excluded. For example, the agents available to make the outbound communication are determined by reviewing the occupancy level of agents, e.g., by obtaining agent data from the contact center 100. The control system 142 can dynamically monitor occupancy level of the agents to determine availability and address the real-time performance metrics of the agent, which can help ensure an appropriate workload that is neither unreasonably high that agent morale decreases nor unproductively low.

In certain embodiments, the control system 142 monitors agent workload and stops assigning customer tasks to agents once agents have exceeded a predetermined work threshold. This can be based on, e.g., legal requirements, such as a maximum permitted workweek, agent preference, determination of an optimum maximum threshold beyond which performance degrades, or the like, or any combination thereof. The control system 142 calculates the amount of utilization time for each agent, so that once agents have reached a predetermined work threshold they will be taken out of the queue for assignment until their occupancy level drops below the predetermined work threshold. In some embodiments, the utilization calculations are done in real-time. "Utilization time," as used herein, means the time agents spend communicating with a customer and time spent doing additional customer related tasks after the communication.

Occupancy level is calculated using the following equation:

Utilization time/logged in time.

When the control system 142 determines available agents to make an outbound communication, agents that are above the predetermined work threshold are excluded from the group considered for the task, and the remaining agents can be ranked.

At step 310, from the list of available agents, the control system 142 determines, for each available agent, agent proficiency for dealing with the customer personality type of each customer to be contacted. Agent proficiency can include, for example, one or more skills relevant to the purpose of the outbound communication, demographic data of the agent, prior ratings by that customer or by an aggregate of customer reviews (e.g., based on time, date, type of interaction, or customer demographic), agent qualification level (e.g., year of experience/tenure, internal achievement of a particular rating, internal/external rating, or any combination thereof), and/or agent personality type. Agent demographic data can include any of gender, race, age, education, accent, income, nationality, ethnicity, area code, zip code, marital status, job status, and credit score. In various embodiments, agent personality type is determined by use of surveys, review of prior customer interactions, or any combination thereof. In some embodiments, the agent personality type is determined in the same manner that the customer personality type is determined, as described above.

At step 312, control system 142 matches or pairs an available agent or group of available agents with each customer on the list. The match-ups can be made based on, for example, pre-existing customer profiles, the customer personality type prediction, and information from an agent database that includes the agent's proficiency scores for handling customers with that personality type. The match-ups can also be made based on a number of other factors, such as the type of task, the agent's training, and the agent's workload.

In some embodiments, routing decisions are based on comparing various customer data and agent data, which may include, e.g., performance based data, demographic data, and other business-relevant data. For example, the control system 142 assesses the skills of agents to establish which agents possess the skills that are most needed for the customer communication.

At step 314, control system 142 provides the list of customers including matched available agents to a call router (or other communication distributor), and the call router, upon routing the call or actually connecting with a customer, transfers the call to an available agent. In certain embodiments, the available agents are ranked based on their proficiency for handling customers with the customer personality type and/or the type of task, and the call router or other communication distributor transfers the call or other communication to the highest ranked agent first. In several embodiments, the matching is dynamically updated as calls or communications are connected or completed.

In some embodiments, an optimum number of communications to be completed in a day may be determined to maximize contact center return or return for a group of agents, customer satisfaction, and/or contact center agent job satisfaction. The threshold level for one or more of these three goals can be manually set or modified as needed.

Inbound communication distribution typically has peaks and valleys in its load, since the demand is generated by outside customers. By linking inbound and outbound communication functions, "outbound agents" can be switched to inbound duty during peak inbound demand periods and switched back to outbound duty during slack periods in inbound demand, thus improving overall staffing efficiency. In certain embodiments, the number of outbound communications to be made is based on a balance between a prediction of how many inbound communications will be received and how many outbound communications need to be made. The number of outbound communications may also be determined to minimize wait times for customers calling in to, or otherwise seeking live communication with, the contact center. In some embodiments, inbound communications may take priority over outbound communications so that the inbound customer may be accommodated quickly. Agent satisfaction may also be taken into account when determining how many communications to initiate. For example, the number of outbound communications to be made can be based on agent workload to ensure that agents are not overworked, thereby potentially reducing attrition of agents and cost of replacing agent(s) to the contact center, and increasing agent morale.

Figure 4:
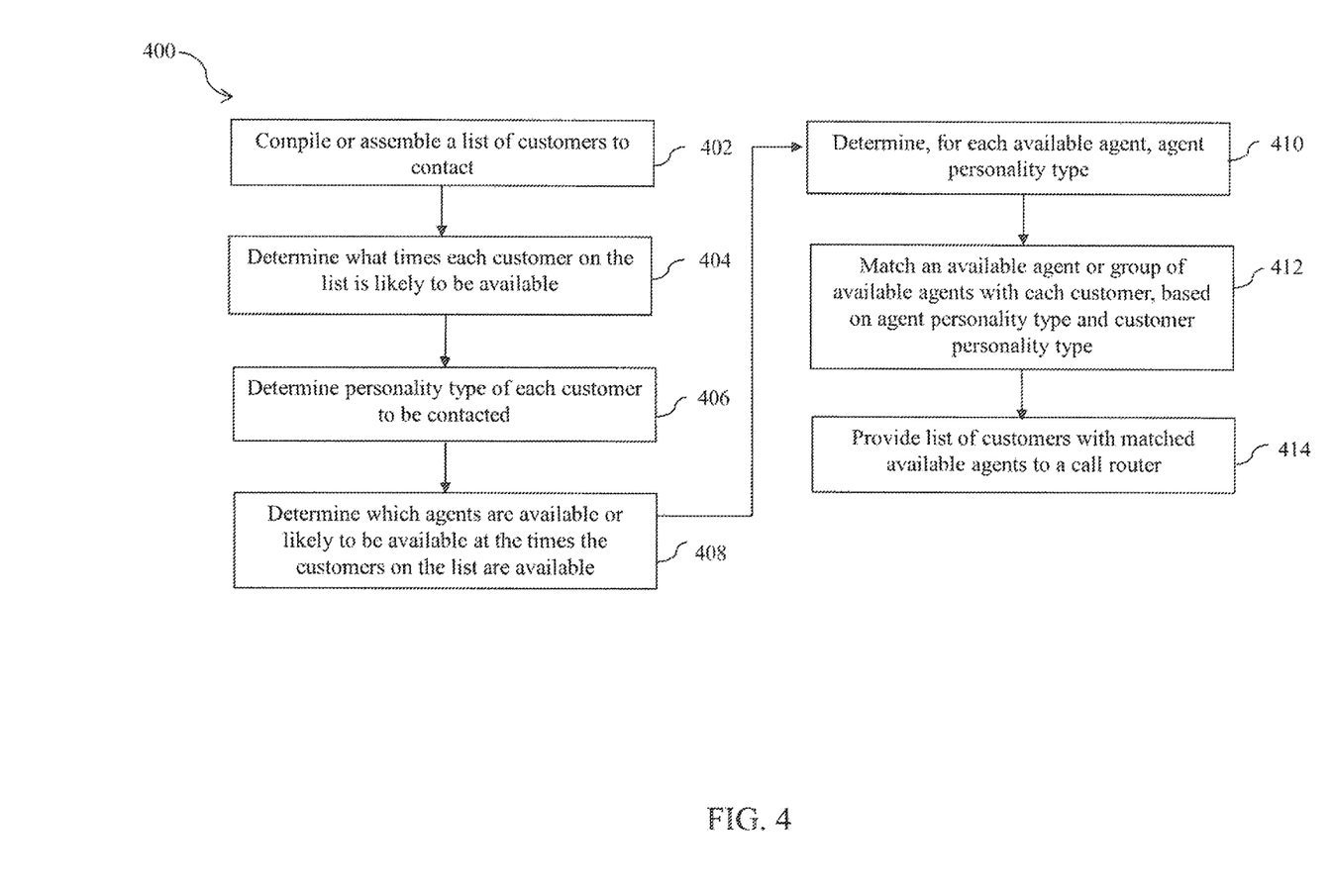
FIG. 4 is a flowchart illustrating a method for routing an outbound customer communication according to another embodiment of the present disclosure.

Another exemplary method 400 of optimizing the routing of outbound customer tasks or communications will now be described with respect to FIG. 4. At step 402, the control system 142 compiles a list of customers to contact. Similar to step 302 described above, the list of customers may be based on the purpose of the communication. In other embodiments, the list can include all customers or potential customers of a specific product, of purchases made during a certain time (e.g., for recall purposes), or other desired segment of customers. It should be understood that lists may be created using combinations of purposes, as well, such as a group of unemployed customers or potential customers who are also looking or expected to be looking for employment assistance services.

At step 404, control system 142 determines what times each customer on the list is likely to be available. For example, customer A may be available between the times of 12-2 pm, and customer B may be available between the times of 7-8 am. Similar to step 304 described above, past interactions with the contact center and/or other organizations can be used to determine availability of the customer. Demographic data can be used in addition to, or as an alternative to past interactions, to determine customer availability.

At step 406, control system 142 determines the personality type of the customers to be contacted. This is similar to step 306 described above.

At step 408, control system 142 determines which agents are available or likely to be available at the times the customers on the list are available. This is similar to step 308 described above.

At step 410, from the list of available agents, control system 142 determines the personality type of each available agent. For example, text of past customer interactions may be input into a linguistic psychological behavioral model to generate a personality type for the available agent.

At step 412, control system 142 matches an available agent or a group of available agents with each customer to be contacted based on agent personality type and customer personality type. Agents who have a personality type compatible with the personality type of customers to be contacted are paired with each customer. For example, a customer with a personality type characterized by emotions may be matched with an agent with a similar personality type.

At step 414, control system 142 provides the list of customers including matched available agents to a call router or other communication distributor. This is similar to step 314 described above.

Another exemplary system and method provides a task pairing network including bi-directional filtering in connection with the contact center agent/customer matching aspect described herein. In this embodiment, the task pairing engine may be used to match potential customers and agents in a manner that permits the agent, the customer, or both, to filter the matched list of customers. This bi-directional filtering can function in either direction, either by (i) pre-selecting the required or desired characteristics to match (or pair) the agent and customer according to filtering criteria set in advance of the matching; or (ii) by creating the matches (or pairs) between agent and customer via the pairing network or engine, and then either (a) permitting the agent or customer to reject or otherwise refuse the match directly, or (b) having the agent or customer further filter the results of the pre-selected pairings with one or more additional criteria to eliminate some of the pairings from qualifying as a match. For example, a list of customers could be provided to the agent, and the agent can filter that list by any available criteria. Alternatively, or additionally, customers can be provided a list of agents (e.g., that have been pre-selected by complementary personality type and availability) and the customer can filter those by any available criteria. Exemplary criteria may include: a maximum number of pairings for the day, agent availability restricted to a pre-set time window (e.g., to permit an agent to work from 8 p.m. to 11 p.m. after another job), geographic location of customer or agent or both (e.g., to facilitate cultural/regional matching), language proficiency or fluency, and any other pairing criteria disclosed herein, or any combination thereof.

This task pairing embodiment thus may facilitate a virtual contact center sharing a pool of talent with other contact centers, where agents can subscribe to work for one or more contact centers in a sharing model, thereby permitting the contact center to match customers with agents, and then permitting either customer or agent to pre-screen, filter, or otherwise accept or reject a match. In effect, the contact center can be a referral network of professionals, including any dedicated service providers. For example, a professional can function as the agent and be task paired with one or more potential customers based on personality type and optionally other criteria discussed herein, and then reject the customers if they are unsuitable (e.g., need help the professional cannot handle, cannot pay, fail a payment pre-screen, or any other criteria or combination of criteria as discussed herein). As a result, in the task pairing embodiment, customers can be paired with any type of professional or a network of professionals. Types of professionals can include, for example, lawyers, doctors, nurse practitioners, insurance agents or adjusters, business consultants, CPAs or other financial consultants, real estate agents, trade contractors (e.g., electricians, plumbers, carpenters, chimney sweep, roofing, stonemason/asphalt, etc.), or any combination thereof. For example, one task pairing network might include a home warranty program where a coordinator agent pairs customers with the relevant trade contractor depending on the repair needed, which may or may not require an initial conversation to determine the best pairing match based on personality type and optionally any other desired criteria as discussed herein.

In some embodiments, customers can rate agents or service providers, which can help route future work flow and pairing assignments to similar customers, can help determine whether and when to promote agents, or even determine that some agents should never be assigned to certain customers or types of customers or customers needing a certain type of assistance. Moreover, in some embodiments, agents or service providers can rate customers or flag other issues in the interaction, e.g., whether the customer concern is legitimate, whether customer is acting appropriately relative to the situation (e.g., a customer is screaming about a shipment that arrived a few hours late that was not requested to be sent by a priority courier, or a customer screaming after having talked with 6 agents over 3 days about an urgent package that was never delivered and was or is being told there is no way to fix the issue), whether the customer has outbursts or other particular issues that might be better handled by a different type of agent pairing on any future contacts, or the like. Task pairing analysis of the ratings by agents and customers of the same interaction may lead to useful information to help address issues, handle future task pairing, permit the agent to adjust her tone or other aspects of an ongoing interaction, etc.

A bulk list of tasks can be provided or generated, e.g., leads (e.g., customers to contact that need or may need assistance) can be assigned one at a time to each agent, or alternatively a list of all leads can be assigned to each agent where the list is intended to cover a discrete time period (e.g., a day, a work period between breaks, a week, etc.). In the latter case, agents can then have more discretion in which customers to call or otherwise initiate a communication with, and when, and how many times, etc. This can be particularly valuable if the agent has built a rapport or even a relationship with particular customers and knows, e.g., that a particular customer is more likely to be available at a certain time or day.

Figure 5:
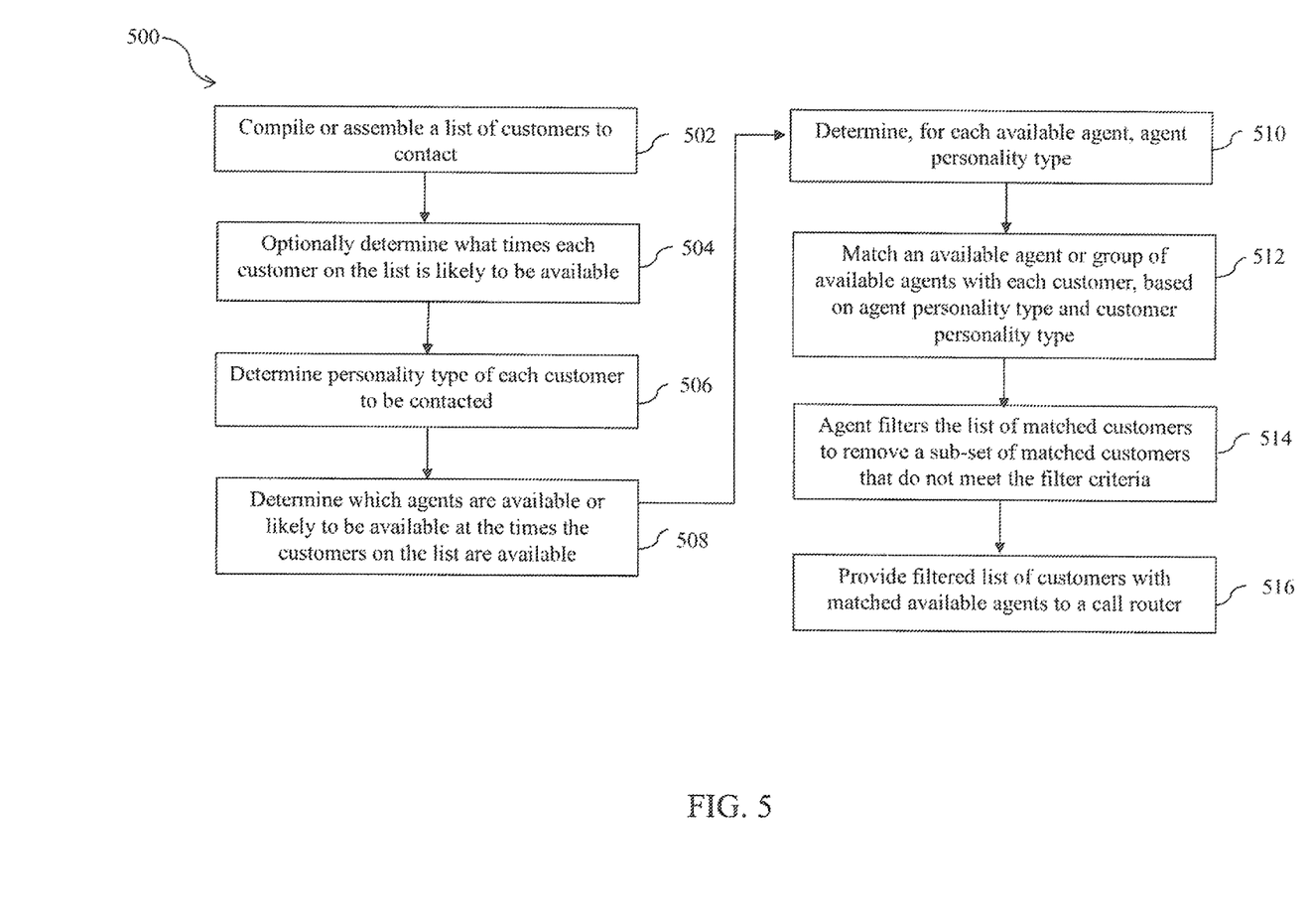
FIG. 5 is a flowchart illustrating a method involving bidirectional filtering for routing an outbound customer communication according to another embodiment of the present disclosure.

Thus, the task pairing embodiment that includes bi-directional filtering is illustrated in exemplary method 500 of optimizing the routing of outbound customer tasks or communications including bi-direction filtering, which will now be described with respect to FIG. 5. At step 502, the control system 142 compiles a list of customers to contact. Similar to step 302 described above, the list of customers may be based on the purpose of the communication. In other embodiments, the list can include all customers or potential customers of a specific product, of purchases made during a certain time (e.g., for recall purposes), or other desired segment of customers. It should be understood that lists may be created using combinations of purposes, as well, such as a group of unemployed customers or potential customers who are also looking or expected to be looking for employment assistance services.

At step 504, control system 142 determines what times each customer on the list is likely to be available. For example, customer A may be available between the times of 12-2 pm, and customer B may be available between the times of 7-8 am. Similar to step 304 described above, past interactions with the contact center and/or other organizations can be used to determine availability of the customer. Demographic data can be used in addition to, or as an alternative to past interactions, to determine customer availability.

At step 506, control system 142 determines the personality type of the customers to be contacted. This is similar to step 306 described above.

At step 508, control system 142 determines which agents are available or likely to be available at the times the customers on the list are available. This is similar to step 308 described above.

At step 510, from the list of available agents, control system 142 determines the personality type of each available agent. For example, text of past customer interactions may be input into a linguistic psychological behavioral model to generate a personality type for the available agent.

At step 512, control system 142 matches an available agent or a group of available agents with each customer to be contacted based on agent personality type and customer personality type. Agents who have a personality type compatible with the personality type of customers to be contacted are paired with each customer. For example, a customer with a personality type characterized by emotions may be matched with an agent with a similar personality type.

At step 514, the agent filters the list of matched customers to remove a sub-set of matched customers that do not meet the filter criteria. Although not depicted, in one optional embodiment, the control system 142 creates a list of multiple agents that match a specific customer, and the customer receives the list of potential agents and some basic information (e.g., personality type, customer ratings, tenure, qualifications, experience, etc.) before the interaction occurs. The customer can then be given a limited time period to filter out undesired agents, as well, in a bidirectional process. The control system 142 can then receive the customer's filtering choices and update the list of matched customers so the customer only appears on the matched lists of agents that meet the customer's filtered choices.

At step 516, control system 142 provides the list of filtered customers including matched available agents to a call router or other communication distributor. This is similar to step 314 described above.

Figure 6:
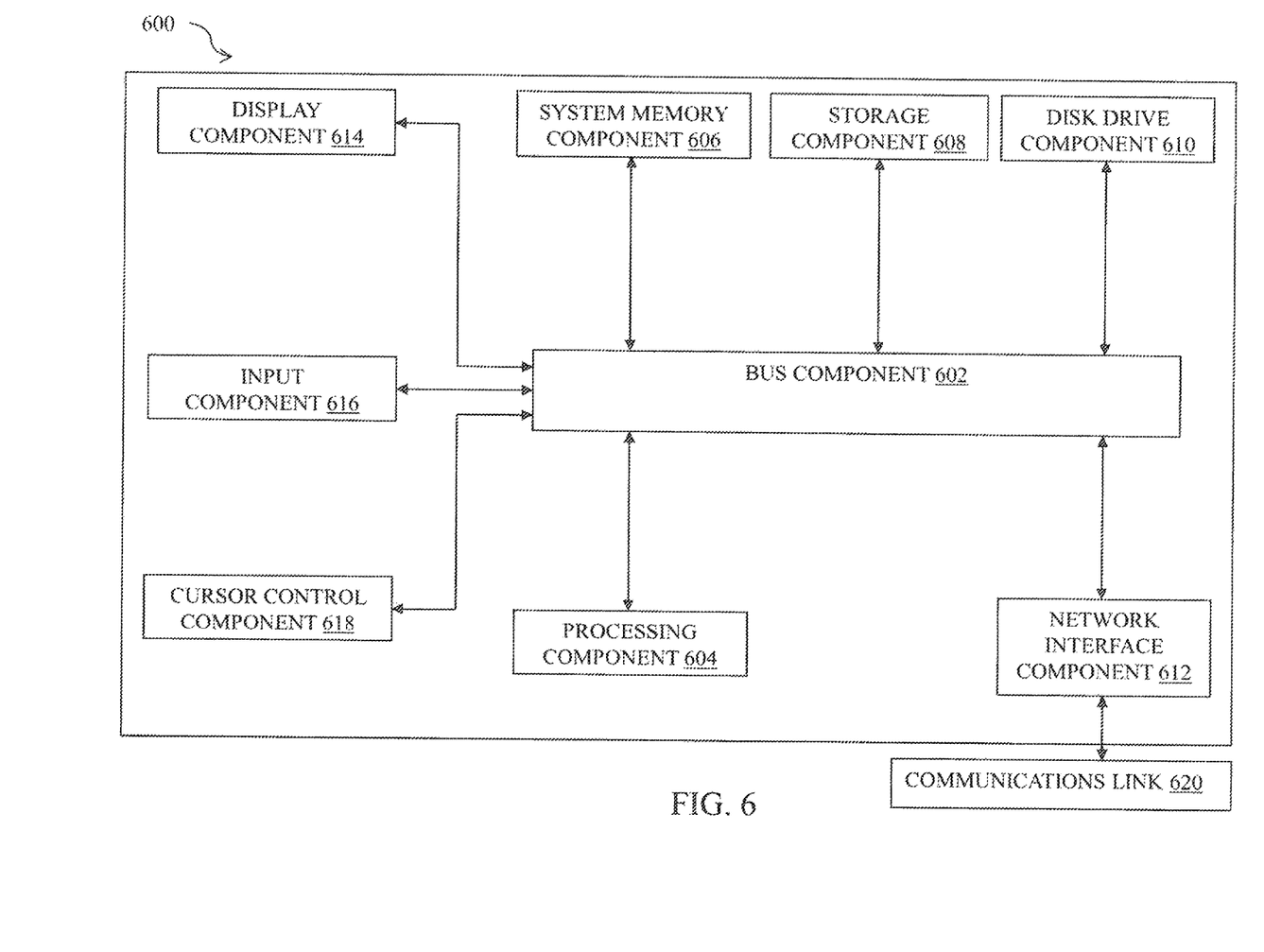
FIG. 6 is a block diagram of a computer system suitable for implementing one or more components of FIG. 1 according to an embodiment of the present disclosure.

Referring now to FIG. 6, illustrated is a block diagram of a system 600 suitable for implementing embodiments of the present disclosure, including contact center control system 142 and analytics system 160. System 600, such as part a computer and/or a network server, includes a bus 602 or other communication mechanism for communicating information, which interconnects subsystems and components, including one or more of a processing component 604 (e.g., processor, micro-controller, digital signal processor (DSP), etc.), a system memory component 606 (e.g., RAM), a static storage component 608 (e.g., ROM), a network interface component 612, a display component 614 (or alternatively, an interface to an external display), an input component 616 (e.g., keypad or keyboard), and a cursor control component 618 (e.g., a mouse pad).

In accordance with embodiments of the present disclosure, system 600 performs specific operations by processor 604 executing one or more sequences of one or more instructions contained in system memory component 606. Such instructions may be read into system memory component 606 from another computer readable medium, such as static storage component 608. These may include instructions to determine availability of customers and/or agents, determine personality type of the customers and/or agents, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 604 for execution. Such a medium may take many forms, including but not limited to, non-volatile media, volatile media, and transmission media. In various implementations, volatile media includes dynamic memory, such as system memory component 606, and transmission media includes coaxial cables, copper wire, and fiber optics, including wires that comprise bus 602. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 600. In various other embodiments, a plurality of systems 600 coupled by communication link 620 (e.g., networks 102 or 104 of FIG. 1, LAN, WLAN, PTSN, or various other wired or wireless networks) may perform instruction sequences to practice the disclosure in coordination with one another. Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

In view of the present disclosure, it will be appreciated that various methods, apparatuses, computer readable media, and systems have been described according to one or more embodiments for routing an outbound communication to an available agent.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to allow a quick determination of the nature of the technical disclosure. It is submitted with the understanding that it will not be used to interpret or limit the scope or meaning of the claims.

What is claimed is:

1. A system for routing outbound communications, comprising:
    a node comprising a processor and a non-transitory computer readable medium operably coupled thereto, the non-transitory computer readable medium comprising a plurality of instructions stored in association therewith that are accessible to, and executable by, the processor, wherein the plurality of instructions when executed:
        compile a list of customers to contact at a specific time for each customer;
        determine which customers on the list are available at the specific time;
        determine a personality type of each available customer;
        determine one or more agents that are available to contact each available customer at the specific time;
        determine, for each available agent, a proficiency for dealing with the personality type of each available customer; and
        match one or more available agents with each available customer based on the one or more available agents' proficiency for dealing with the personality type of each available customer; and
    a communication distributor in operative communication with the node that routes each outbound communication of the one or more available agents to each available customer based on the matching.

2. The system of claim 1, wherein determining the personality type of each available customer comprises one or more of retrieving the personality type of an available customer and applying a linguistic model to text of one or more past interactions or social media data of the available customer.

3. The system of claim 1, wherein determining which customers on the list are available comprises analyzing one or more of interaction history of a customer and demographic information of a customer.

4. The system of claim 3, wherein the interaction history indicates what times of day a customer is available to answer an outbound communication from the available agent.

5. The system of claim 3, wherein the demographic information comprises one or more of gender, race, age, education, accent, income, nationality, ethnicity, area code, zip code, marital status, job status, and credit score.

6. The system of claim 1, wherein the proficiency for dealing with the personality type of each available customer comprises one or more of: agent skills relevant to the purpose of an outbound communication, agent demographic data, and agent personality type.

7. The system of claim 6, wherein the plurality of instructions, when executed, further determine the agent personality type including by using surveys, review of prior customer interactions, or both.

8. The system of claim 1, wherein determining the one or more agents that are available to contact each available customer comprises excluding available agents that have exceeded a predetermined work threshold.

9. The system of claim 1, wherein the plurality of instructions, when executed, further communicate the matching of the one or more available agents with each available customer to the communication distributor.

10. The system of claim 9, wherein the plurality of instructions, when executed, further update the matching of the one or more available agents with each available customer as outbound communications are connected.

11. The system of claim 1, wherein the plurality of instructions, when executed, further optimize the number of outbound communications.

12. The system of claim 11, wherein optimizing the number of outbound communications is based on one or more of contact center return, customer satisfaction, and agent job satisfaction.

13. A method of routing outbound communications, which comprises,
receiving, by one or more processors, a list of customers to contact;
determining, by the one or more processors, a time that each customer on the list is available;
determining, by the one or more processors, a personality type of each customer on the list;
determining, by the one or more processors, availability of one or more agents at the time that each customer on the list is available;
determining, by the one or more processors, a personality type of each available agent; and
matching, by the one or more processors, the one or more available agents with each customer on the list based on the personality type of each customer on the list and the personality type of each available agent; and
routing, by a communication distributor in operative communication with the one or more processors, each outbound communication of the one or more available agents to each customer on the list.

14. The method of claim 13, wherein determining the personality type of each customer on the list comprises one or more of retrieving the personality type of a customer and applying a linguistic model to text of one or more past interactions or social media data of a customer.

15. The method of claim 13, wherein determining a time that each customer on the list is available comprises analyzing one or more of interaction history of a customer and demographic information of a customer.

16. The method of claim 15, wherein the interaction history indicates what times of day a customer is available to answer an outbound communication from the available agent.

17. The method of claim 15, wherein the demographic information comprises one or more of gender, race, age, education, accent, income, nationality, ethnicity, area code, zip code, marital status, job status, and credit score.

18. The method of claim 13, wherein determining the personality type of each available agent comprises using surveys, reviewing prior customer interactions, or both.

19. The method of claim 13, wherein determining the availability of one or more agents at the time that each customer on the list is available comprises excluding available agents that have exceeded a predetermined work threshold.

20. The method of claim 13, which further comprises updating the matching of the one or more available agents with each customer to be contacted as outbound communications are routed.

21. The method of claim 13, which further comprises optimizing the number of outbound communications.

22. The method of claim 21, wherein optimizing the number of outbound communications is based on one or more of contact center return, customer satisfaction, and agent job satisfaction.

23. A non-transitory computer readable medium comprising a plurality of instructions, which in response to a computer system, cause the computer system to perform a method which comprises:
receiving a list of customers to contact;
determining a time when each customer on the list is available to answer an outbound communication from an agent;
determining a personality type of each customer on the list;
determining availability of a plurality of agents at the time when each customer on the list is available;
determining a personality type of each available agent from the plurality of available agents;
pairing a plurality of available agents with each customer on the list based on the personality type of each customer on the list and the personality type of each available agent from the plurality of available agents;
ranking the plurality of available agents based on the personality type of each available agent and one or more skills relevant to the purpose of the outbound communication possessed by each available agent; and
provide to a communication distributor in operative communication with the computer system, the ranking so that the communication distributor can route each outbound communication of the plurality of available agents to each customer on the list based on the ranking.

24. The non-transitory computer readable medium of claim 23, wherein determining a time when each customer on the list is available comprises analyzing one or more of interaction history of a customer and demographic information of a customer.

25. The non-transitory computer readable medium of claim 24, wherein the interaction history indicates one or more times that a customer is available to answer the outbound communication.

26. The non-transitory computer readable medium of claim 24, wherein the demographic information comprises one or more of gender, race, age, education, accent, income, nationality, ethnicity, area code, zip code, marital status, job status, and credit score.

27. The non-transitory computer readable medium of claim 23, wherein determining availability of a plurality of agents at the time when each customer on the list is available comprises excluding available agents that have exceeded a predetermined work threshold.

28. The non-transitory computer readable medium of claim 23, wherein the method further comprises updating the pairing of the plurality of available agents with each customer on the list as outbound communications are routed.

29. The non-transitory computer readable medium of claim 23, wherein the method further comprises optimizing the number of outbound communications.

30. The non-transitory computer readable medium of claim 29, wherein optimizing the number of outbound communications is based on one or more of contact center return, customer satisfaction, and agent job satisfaction.

\* \* \* \* \*